(12) United States Patent
Zakel et al.

(10) Patent No.: US 6,955,284 B2
(45) Date of Patent: Oct. 18, 2005

(54) DEVICE FOR POSITIONING A TOOL IN RELATION TO A WORKPIECE

(75) Inventors: Elke Zakel, Falkenssee (DE); Paul Kasulke, Berlin (DE); Oliver Uebel, Berlin (DE); Lars Titerle, Berlin (DE)

(73) Assignee: Pac Tec-Packaging Technologies GmbH, Nauen (bei Berlin) (DE)

( * ) Notice: Subject to any disclaimer, the term of this patent is extended or adjusted under 35 U.S.C. 154(b) by 67 days.

(21) Appl. No.: 10/398,788
(22) PCT Filed: Oct. 2, 2001
(86) PCT No.: PCT/EP01/11422
§ 371 (c)(1), (2), (4) Date: Jun. 20, 2003
(87) PCT Pub. No.: WO02/28590
PCT Pub. Date: Apr. 11, 2002

(65) Prior Publication Data
US 2004/0129756 A1 Jul. 8, 2004

(30) Foreign Application Priority Data
Oct. 6, 2000 (DE) .......................... 100 49 584

(51) Int. Cl.$^7$ .................. B23Q 15/00; B23Q 16/00; B23K 1/14; B23K 37/04
(52) U.S. Cl. ............... 228/9; 228/49.1; 219/121.65; 219/121.82
(58) Field of Search ............... 228/102, 103, 228/105, 245–255, 8–10, 32, 41, 45, 49.1; 219/121.6, 121.63, 121.65, 121.78, 121.82; 356/4.01, 4.03, 4.07, 614, 615

(56) References Cited

U.S. PATENT DOCUMENTS

| 2,696,565 | A | | 12/1954 | Shockley |
| 4,187,051 | A | | 2/1980 | Kirsch et al. |
| 4,813,588 | A | * | 3/1989 | Srivastava et al. .......... 228/103 |
| 5,113,565 | A | * | 5/1992 | Cipolla et al. ............. 29/25.01 |
| 5,199,628 | A | * | 4/1993 | Homma ....................... 228/4.5 |
| 5,249,035 | A | | 9/1993 | Yamanaka |
| 5,501,388 | A | | 3/1996 | Takeuchi |
| 5,667,130 | A | * | 9/1997 | Morita et al. ............. 228/110.1 |
| 5,702,049 | A | * | 12/1997 | Biggs et al. ................ 228/105 |
| 5,897,048 | A | * | 4/1999 | Cheng et al. ............. 228/180.5 |
| 5,938,952 | A | * | 8/1999 | Lin et al. ................ 219/121.64 |
| 6,386,433 | B1 | * | 5/2002 | Razon et al. ................ 228/246 |
| 6,516,990 | B2 | * | 2/2003 | Hess et al. .................... 228/4.5 |
| 6,669,076 | B2 | * | 12/2003 | Nogawa ....................... 228/4.5 |
| 6,715,660 | B2 | * | 4/2004 | Seki et al. ....................... 228/8 |
| 6,729,528 | B2 | * | 5/2004 | Seki et al. ....................... 228/8 |
| 6,824,037 | B2 | * | 11/2004 | Sakai et al. .................... 228/4.5 |

FOREIGN PATENT DOCUMENTS

| EP | 0 859 681 B1 | 8/1998 |
| EP | 1 014 438 A2 | 6/2000 |

* cited by examiner

Primary Examiner—Colleen P. Cooke
(74) Attorney, Agent, or Firm—Dougherty, Clements & Hofer

(57) ABSTRACT

The device for positioning a tool (1) in relation to a workpiece (6) controls drives (2, 3, 4) in relation to three spatial axes (x, y, z) through two cameras (10, 11), the first (1) of which takes an image essentially along a spatial axis (y), the other (11) being oriented essentially vertically with respect to a surface (8) of the workpiece.

8 Claims, 4 Drawing Sheets

Ansicht der Kamera 11

Ansicht der Kamera 10

DEVICE FOR POSITIONING A TOOL IN RELATION TO A WORKPIECE

The invention relates to a device for positioning a tool in relation to a workpiece.

U.S. Pat. No. 4,187,051 shows a device for positioning a tool in relation to a workpiece with three drives for positioning the tool relative to the workpiece along at least three spatial axes. The position of the workpiece is determined with the aid of two cameras which are each oriented along a spatial axis, the two spatial axes being perpendicular to each other. The cameras react to light/dark contrasts and thus detect the position and orientation of the workpiece. One of the cameras determines a coarse position image while the other detects a high-resolution image for precision positioning. Drives move both cameras and the tool, a gripping arm in this case. The position detection is effected in that the cameras are moved until the image picked up corresponds with a stored image. The tool coupled with drives is thus then correctly oriented relative to the workpiece.

U.S. Pat. No. 5,501,388 describes a bonding device which has a single camera for detection of a workpiece. Used for bonding is a capillary which supplies pieces of material to the workpiece.

EP 0 859 681 B1 shows a device for relative positioning of a capillary as a tool and of a workpiece by means of drives which enable a relative motion along three cartesian spatial axes.

It is customary with machine tools to control the drives for the individual spatial axes through stepping motors, the increments of the stepping motors then being counted which is a measure for the position. For precise machining, however, extremely accurate clamping of the workpiece is also necessary then.

An important field of application for the invention is the application of pieces of material to a workpiece.

For the purposes of the invention, pieces of material can be pieces of any material in solid or liquid form. It can be a solderable material such as gold, copper, tin, glass or a plastic which are, in particular, micro-size pieces of material in the form of solder pellets, glass globules or plastic globules. It can also be pieces of ceramic or components such as miniature circuits, surface mounted devices or the like. Generally speaking, any material can be applied with the invention.

The application of pieces of material such as solder pellets in the form of so-called bumpers also requires a maximum of precision in the positioning of the workpiece such as a capillary which feeds the solder pellets. Accordingly, clamping of the workpieces is quite costly because it directly determines the accuracy of the work. A maximum of tool positioning accuracy is often also required in other operations such as the assembly of components on printed boards, the removal of soldered joints from boards, etc.

It is thus the object of the invention to improve the device so as to reduce the amount of work needed for clamping the workpieces while still maintaining the required accuracy of positioning.

This object is achieved by the features indicated in patent claim 1. Advantageous developments of the invention can be seen in the sub-claims.

The basic principle of the invention consists in the control of the relative positioning through cameras. The accuracy of the workpiece clamping then has no influence on the operating accuracy since the positioning of the tool is controlled through cameras which orient themselves on the workpiece itself, particularly on its edges.

The invention is explained in more detail below by means of example embodiments in connection with the drawing in which.

The same reference symbols in the individual figures designate the same or functionally equivalent parts.

Although the example embodiments in FIG. 1 to 5 relate to the application of solder pellets, it is expressly pointed out that any positioning of a tool relative to a workpiece is possible with the invention and the application of pieces of material such as defined at the outset can also be carried out as well as the removal of pieces of material such as soldered joints from an object.

Figure 1:
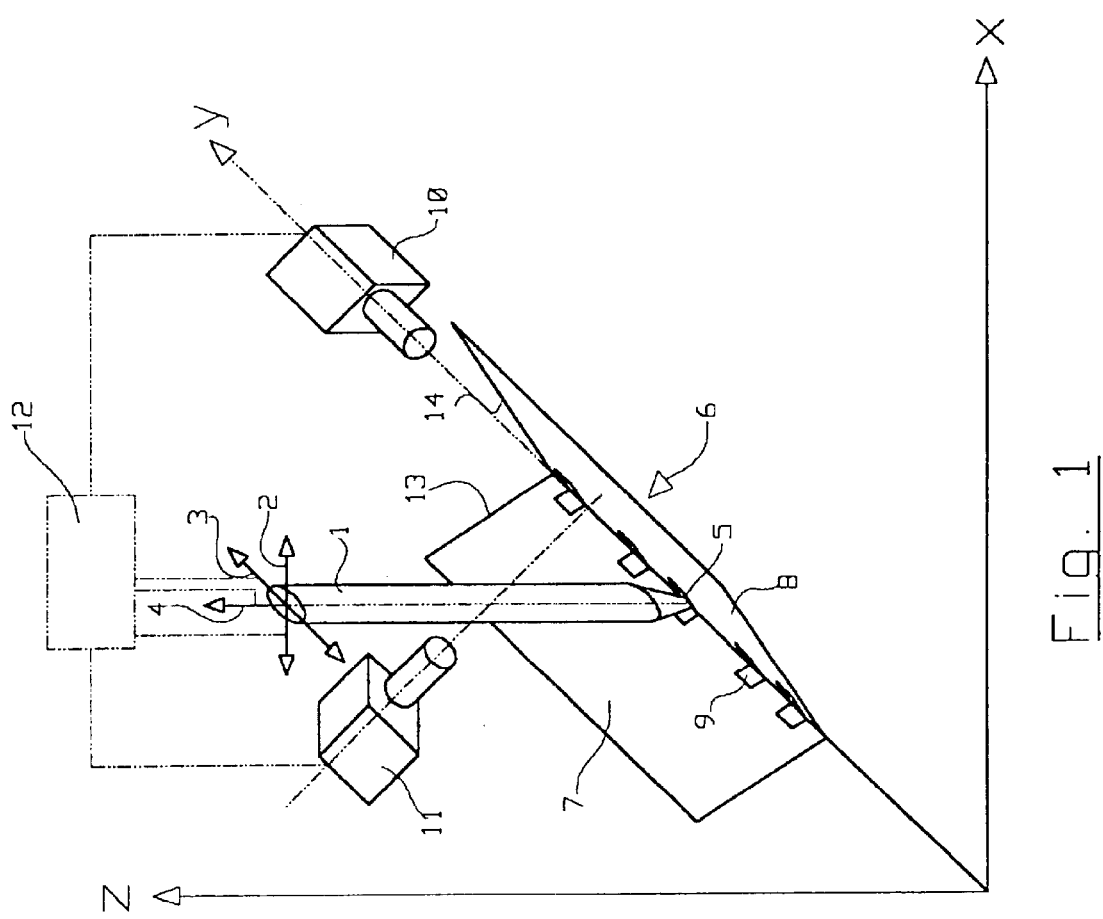
FIG. 1 is a schematic diagram of the invented device in a first example embodiment.

Reference is first made to FIG. 1. A capillary 1 through which a solder pellet can be applied is displaced by means of three drives 2, 3 and 4 relative to a workpiece 6 along three cartesian spatial axes x, y and z Naturally, this is a relative displacement, that is, the drives 2, 3 and 4 can also be associated with a cross table (not shown) on which the workpiece 6 is clamped.

The solder is fed to the workpiece at the tip 5 of the capillary 1 and melted there in a conventional way by a laser impulse. Here, the workpiece 6 has two surfaces 7 and 8 which are vertical with respect to each other, the workpiece being clamped so that the intersection line of the two surfaces 7 and 8 are in precisely one axis, here the y-axis. The surfaces 7 and 8 are thus each at an angle of 45 degrees to the x-y plane.

The drives 2, 3 and 4 arc now to be controlled so that the tip 5 of the capillary is positioned at preset points 9 of the workpiece 6 so that a solder pellet is applied there and a "bumper" is soldered on. To control the drives, two cameras 10 and 11 are provided, the images of which are analyzed by a control unit resulting in control commands for the drives 2, 3 and 4.

One camera, here camera 10, is oriented essentially on the y-axis. It is thus used to detect the relative position between the tip 5 of the capillary 1 and the workpiece 6 with respect to the x-z plane. The processing of the images of the camera is effected through edge recognition. The camera 10 thus essentially detects an image of the two edges 13 and 14 of surfaces 7 and 8 facing it as well as the tip 5 of the capillary 1.

The second camera 11 is positioned so that it is oriented vertically with respect to a surface 8 of the workpiece. It is thus used to monitor the relative position between the capillary and workpiece relative to the y-axis and to control the drive 3 for this axis. The image analyzer can analyze the edge 14 of the surface 8 here or also the contour of the place 9 where the solder is to be applied.

Figure 2:
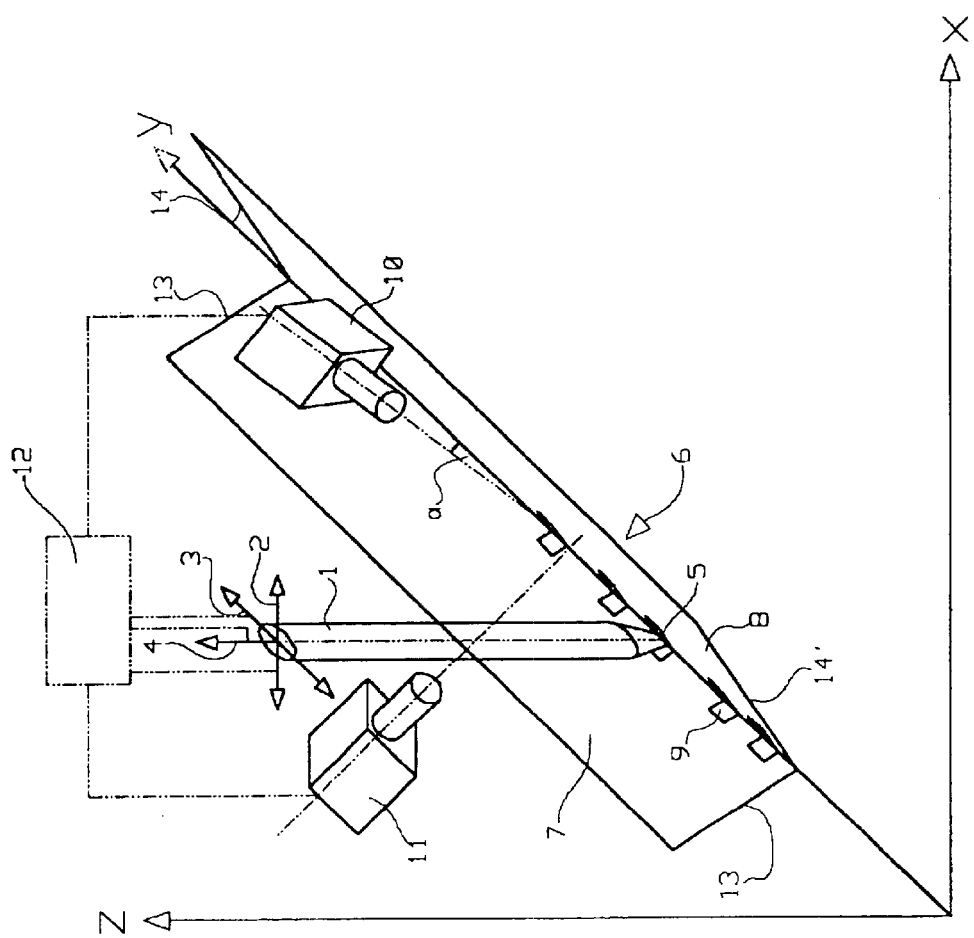
FIG. 2 is a schematic diagram of a second example embodiment of the invention.

In the example embodiment shown in FIG. 2, the workpiece 6 in the y-direction is so long that it would collide with the camera 10. The camera 10 is thus oriented at an angle alpha relative to the y-axis, the workpiece 6 being moved in the y-direction, not the capillary 1. The camera 10 detects the edges 13' and 14' of the surfaces 7 and 8 as well as the position of the tip 5 relative to the x-z plane.

The camera 11 is again oriented in the same way as in the example embodiment of FIG. 1, that is, vertical to the surface 8 of the workpiece 6.

Figure 3:
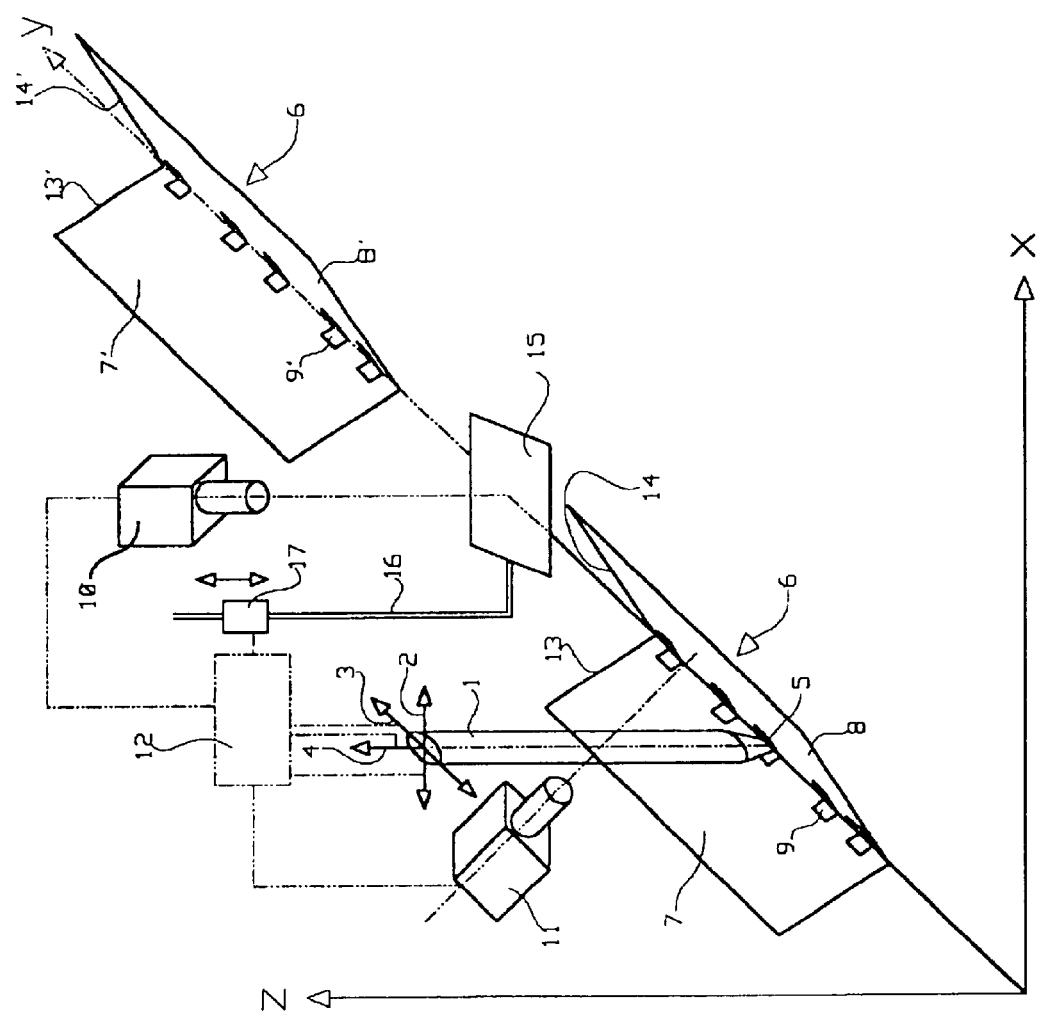
FIG. 3 is a schematic diagram of a third example embodiment of the invention.

In the example embodiment of FIG. 3, a number of workpieces 6, 6', etc. are lined up one after the other along the y-axis, the workpieces being moved at least along the y-axis here as well with the capillary 1 being stationary. Since a camera positioned in the y-axis would collide with the workpieces here as well, provision is made for running a mirror 15 between successive workpieces 6 and 6', this mirror being tilted by 45 degrees relative to the x-y plane. The camera is then oriented parallel with the z-axis and transfers an image to the control 12 corresponding to the image taken directly in the y-axis. The mirror 15 can be moved by an arm 16 and a drive 17 at least parallel to the z-axis so that individual workpieces can pass under it. As soon as the next workpiece is lined up for processing, the mirror 15 will be run down again in the z-direction.

The camera 11 is again positioned vertical to the plane 8 of the workpiece 6.

Figure 4:
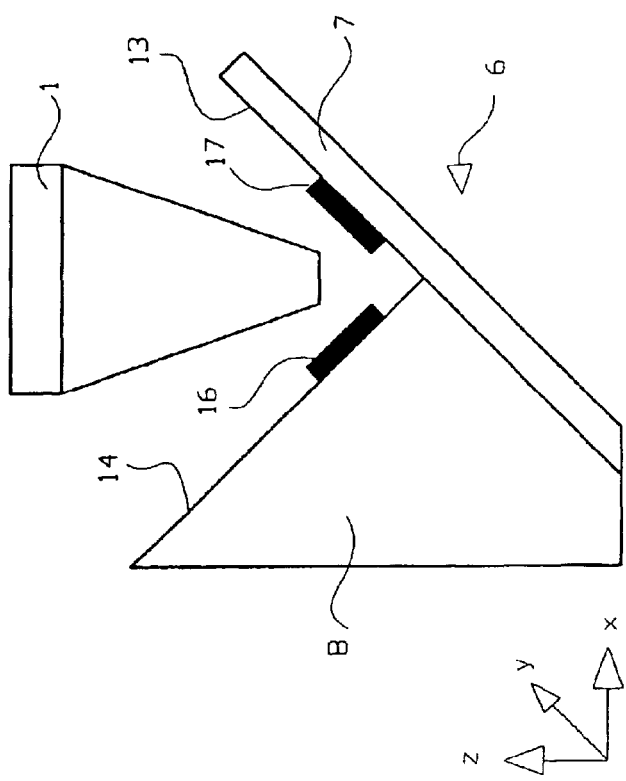
FIG. 4 is a schematic image seen by the camera mounted in the y-direction according to which the tool is positioned in the x- and z-directions.

FIG. 4 schematically shows the image "seen" by the camera 10 with the tool 1, the workpiece 6 in the form of two printed circuit boards 7 and 8 along with the edges 13 and 14 on which the image analyzer and the control are oriented. So-called pads 16 and 17 having sharp edges on which the image analyzer can be oriented can also be mounted on the workpiece. These pads are arranged in a predefined position with respect to the soldered joint. The image represented in FIG. 4 can be used to position the tool 1 in the z and x-direction.

Figure 5:
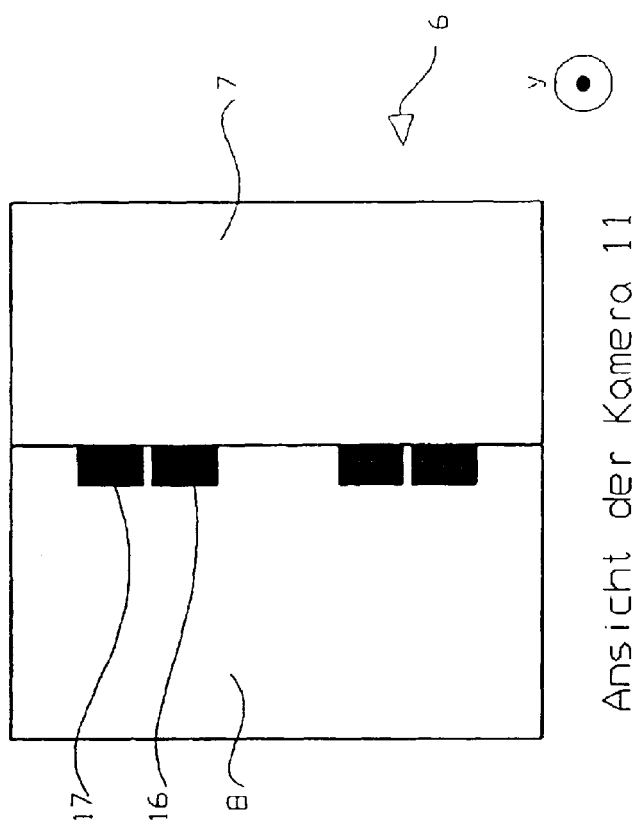
FIG. 5 is an image of the second camera used to position the tool in the y-direction.

FIG. 5 shows an image seen by the camera 11 which carries out the positioning using the edges or the pads in the y-direction.

What is claimed is:

1. Device for positioning a tool (1) in relation to a workpiece (6), said device having:
    three drives (2, 3 and 4), which enable positioning of the tool (1) relative to the workpiece (6) in at least two of three perpendicular spatial axes x, y and z;
    two cameras (10, 11) positioned between the tool (1) and the workpiece (6), the first camera (10) essentially along a spatial axis (y) being positioned for taking an image of a first workpiece edge, and the second camera being positioned for taking an image with respect to spatial axis (y), and the second camera (11) being oriented perpendicularly with respect to a second surface of the workpiece; and
    a control unit operatively connected to said cameras and to said tool, whereby, based on the two images from said cameras (10, 11), said control unit analyzes the position of the tool relative to the workpiece along the three cartesian spatial axes (x, y and z-axes) resulting in the issuance of control commands for the three drives (2, 3, 4) along the perpendicular spacial axes.

2. Device as described in claim 1, characterized in that the first camera (10) is oriented at an acute angle (alpha) in relation to the spatial axis (y).

3. Device as described in claim 1, characterized in that the first camera (10) is oriented vertically with respect to the spatial axis (y) and a mirror (15) is mounted at a tilt angle of 45 degrees in relation to the x-y plane for taking an image of the workpiece (6) essentially along the spatial axis (y) through said mirror (15).

4. Device as described in claim 3, characterized in that the mirror (15) is arranged to shift along the axis (z) in the first camera (10).

5. Device as described in claim 1, characterized in that the tool is a capillary (1) adapted to feed pieces of material to the workpiece (6).

6. Device as described in claim 5, further comprising means for liquifaction of any meltable material fed to the workpiece.

7. Device as described in claim 6, characterized in that the liquefaction means is a laser.

8. Device for positioning a tool (1) in relation to a workpiece (6), said device having:
    three drives (2, 3 and 4), which enable positioning of the tool (1) relative to the workpiece (6) in at least two of three perpendicular spatial axes x, y and z;
    two cameras (10, 11) positioned between the tool (1) and the workpiece (6), the first camera (10) directly along spatial axis (y) being positioned for taking an image of a first workpiece edge, and the second camera being positioned for taking an image with respect to spatial axis (y), the second camera (11) being oriented perpendicularly with respect to a second surface of the workpiece; and
    a control unit operatively connected to said first and second cameras and to said tool, for analyzing the position of the tool relative to the workpiece along the three cartesian spatial axes (x, y and z-axes) and for issuing control commands for the three drives (2, 3, 4) to move the tool along the perpendicular spacial axes to the proper position relative to the workpiece.

* * * * *